US011781005B2

(12) United States Patent
Kim et al.

(10) Patent No.: US 11,781,005 B2
(45) Date of Patent: Oct. 10, 2023

(54) THERMOPLASTIC RESIN COMPOSITION AND MOLDED PRODUCT USING THE SAME

(71) Applicant: Lotte Chemical Corporation, Seoul (KR)

(72) Inventors: Jungwook Kim, Uiwang-si (KR); Jieun Park, Uiwang-si (KR); Seongwoo Kang, Uiwang-si (KR); Keehae Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 256 days.

(21) Appl. No.: 16/943,025

(22) Filed: Jul. 30, 2020

(65) Prior Publication Data

US 2021/0032455 A1 Feb. 4, 2021

(30) Foreign Application Priority Data

Jul. 31, 2019 (KR) .................. 10-2019-0093446

(51) Int. Cl.
| C08L 33/10 | (2006.01) |
| C08L 51/00 | (2006.01) |
| C08F 212/10 | (2006.01) |
| C08F 265/04 | (2006.01) |
| C08K 5/17 | (2006.01) |
| C08K 5/3432 | (2006.01) |
| C08K 5/3492 | (2006.01) |
| C08L 25/12 | (2006.01) |
| C08L 33/18 | (2006.01) |

(52) U.S. Cl.
CPC ............ *C08L 33/10* (2013.01); *C08F 212/10* (2013.01); *C08F 265/04* (2013.01); *C08K 5/175* (2013.01); *C08K 5/3432* (2013.01); *C08K 5/34926* (2013.01); *C08L 25/12* (2013.01); *C08L 33/18* (2013.01); *C08L 51/003* (2013.01); *C08L 2205/03* (2013.01)

(58) Field of Classification Search
CPC ...... C08L 33/10; C08L 51/003; C08F 212/10; C08F 265/04; C08K 5/17
See application file for complete search history.

(56) References Cited

U.S. PATENT DOCUMENTS

| 3,402,987 | A | * | 9/1968 | Dalton | .............. | D06P 3/00 |
| | | | | | | 8/514 |
| 5,354,486 | A | * | 10/1994 | Evans | ............ | C10M 133/08 |
| | | | | | | 508/516 |
| 8,921,019 | B2 | * | 12/2014 | Kwon | ............... | G03F 7/105 |
| | | | | | | 430/165 |
| 2002/0114940 | A1 | * | 8/2002 | Clemens | ........... | B05D 7/148 |
| | | | | | | 427/407.1 |
| 2005/0049336 | A1 | | 3/2005 | Gugumus | | |
| 2012/0172499 | A1 | | 7/2012 | Na et al. | | |
| 2013/0158161 | A1 | * | 6/2013 | Kim | ................. | C08L 69/00 |
| | | | | | | 523/122 |
| 2013/0183536 | A1 | * | 7/2013 | Kaneda | ............. | C08L 51/04 |
| | | | | | | 524/496 |
| 2015/0005435 | A1 | * | 1/2015 | Park | ................ | C08L 25/12 |
| | | | | | | 525/71 |
| 2015/0291793 | A1 | | 10/2015 | Minkwitz et al. | | |
| 2016/0060446 | A1 | | 3/2016 | Park et al. | | |
| 2019/0062527 | A1 | * | 2/2019 | Mizushima | ........... | C08K 13/02 |
| 2020/0079951 | A1 | | 3/2020 | Yang | | |

FOREIGN PATENT DOCUMENTS

| CN | 102161808 A | 8/2011 |
| CN | 105504569 A | 4/2016 |
| CN | 108610560 A | 10/2018 |
| CN | 108699291 A | 10/2018 |
| EP | 3564309 A1 | 11/2019 |
| JP | 2002-121309 A | 4/2002 |
| JP | 2002-159093 A | 5/2002 |
| JP | 2007-211034 A | 8/2007 |
| JP | 5669584 A | 6/2011 |
| JP | 5092087 B2 | 12/2012 |
| KR | 10-2010-0002408 A | 1/2010 |
| KR | 10-2013-0130687 A | 12/2013 |
| KR | 10-2014-0068672 A | 6/2014 |
| KR | 10-1924672 A | 6/2014 |
| KR | 10-2014-0096037 A | 8/2014 |
| KR | 10-2016-0026125 A1 | 3/2017 |

(Continued)

OTHER PUBLICATIONS

Search Report in counterpart European Application No. 20188754.4 dated Nov. 23, 2020, pp. 1-5.
Search Report dated Nov. 7, 2022, attached to a Notice of Allowance dated Nov. 15, 2022, in counterpart Chinese Patent Application No. 202010761280.3, pp. 1-6.

*Primary Examiner* — Robert D Harlan

(74) *Attorney, Agent, or Firm* — Additon, Pendleton & Witherspoon, P.A.

(57) ABSTRACT

A thermoplastic resin composition includes: 100 parts by weight of a base resin including (A) about 35 wt % to about 55 wt % of an acrylic graft copolymer; (B) about 35 wt % to about 55 wt % of an aromatic vinyl-vinyl cyanide copolymer; and (C) about 2 wt % to about 15 wt % of an alkyl(meth)acrylate-based resin; (D) about 0.4 parts by weight to about 2 parts by weight of a first sterically hindered amine represented by Chemical Formula 1 described in the detailed description; and (E) about 0.4 parts by weight to about 2 parts by weight of a second sterically hindered amine represented by Chemical Formula 2 described in the detailed description.

13 Claims, No Drawings

(56) References Cited

FOREIGN PATENT DOCUMENTS

| KR | 10-2018-0111662 A | 10/2018 | |
|----|----|----|----|
| KR | 10-2014-0072015 A1 | 12/2018 | |
| WO | 2009/112425 A1 | 9/2009 | |
| WO | 2014-084453 A1 | 6/2014 | |
| WO | WO-2014084453 A1 * | 6/2014 | ............. C08K 5/005 |
| WO | 2017-150662 A1 | 9/2017 | |
| WO | 2018-124594 A1 | 7/2018 | |

* cited by examiner

THERMOPLASTIC RESIN COMPOSITION AND MOLDED PRODUCT USING THE SAME

CROSS-REFERENCE TO RELATED APPLICATION

This application claims priority to and the benefit of Korean Patent Application No. 10-2019-0093446 filed in the Korean Intellectual Property Office on Jul. 31, 2019, the entire disclosure of which is incorporated herein by reference.

FIELD

The present disclosure relates to a thermoplastic resin composition and a molded product using the same.

BACKGROUND

Recently, thermoplastic resins have replaced conventional glass and metal materials in the production of various products such as electric/electronic products, automobiles, construction materials, leisure goods, and the like. Accordingly, there is increased demand for a thermoplastic resin capable of realizing excellent impact resistance, weather resistance, molding workability, and high quality appearance.

For example, an acrylonitrile-butadiene-styrene copolymer resin (hereinafter, ABS resin) can be used as the thermoplastic resin. ABS resin includes a chemically unstable double bond in a rubber component, and the rubber component may be easily aged by ultraviolet (UV) radiation. Thus, the ABS resin does not generally have sufficient weather resistance and light resistance. Accordingly, when left outside for a long time, the acrylonitrile-butadiene-styrene copolymer resin is discolored and exhibits large property deterioration, as time passes and accordingly, is not suitable for outdoor use exposed to sunlight.

In contrast, an acrylonitrile-styrene-acrylate copolymer resin (hereinafter, ASA resin) includes a chemically stable acrylic rubbery polymer instead of the butadiene-based rubbery polymer as the rubber component. ASA resin accordingly does not have the discoloring and property deterioration problems of ABS resin due to ultraviolet (UV) radiation exposure over time. In addition, the ASA resin has excellent moldability, chemical resistance, and thermal stability and the like as well as weather resistance.

Recently, there have been increased requirements for an environmentally friendly non-painted (unpainted) thermoplastic resin usable without a painting process. The non-painted thermoplastic resin should have excellent scratch resistance, coloring properties, impact resistance, weather resistance, and the like, for a non-painted molded product is used as it is. As the level of property requirements has recently increased, there have been more attempts to use the ASA resin.

In general, this ASA resin further includes an ultraviolet (UV) stabilizer to reinforce weather resistance.

However, the ultraviolet (UV) stabilizer and/or other additives may migrate onto the surface of a molded product and cause generation of volatile gas and accordingly, form unintentional molding deposits during manufacture of the molded product.

Accordingly, there is a need for a thermoplastic resin composition that can exhibit excellent scratch resistance, weather resistance, and impact resistance and generate a small amount of volatile gas during manufacture of a molded product.

SUMMARY OF THE INVENTION

The present disclosure relates to a thermoplastic resin composition that can have excellent scratch resistance, weather resistance, and impact resistance, and have less volatile gas generation during a manufacture of a molded product, and a molded product including the same.

The thermoplastic resin composition includes: 100 parts by weight of a base resin including (A) about 35 wt % to about 55 wt % of an acrylic graft copolymer; (B) about 35 wt % to about 55 wt % of an aromatic vinyl-vinyl cyanide copolymer; and (C) about 2 wt % to about 15 wt % of an alkyl(meth)acrylate-based resin; (D) about 0.4 parts by weight to about 2 parts by weight of a first sterically hindered amine represented by Chemical Formula 1; and (E) about 0.4 parts by weight to about 2 parts by weight of a second sterically hindered amine represented by Chemical Formula 2.

Chemical Formulae 1 and 2 may be as follows.

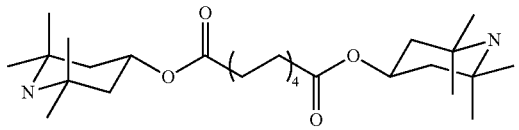

[Chemical Formula 1]

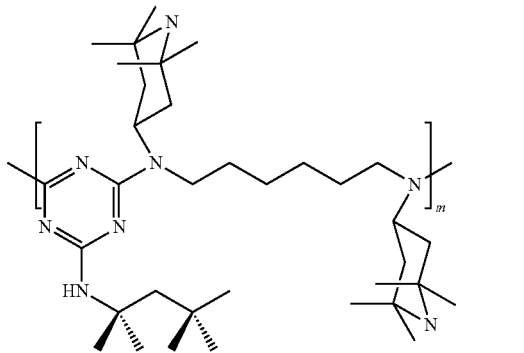

[Chemical Formula 2]

In Chemical Formula 2, m is an integer of 2 to 20.

The acrylic graft copolymer (A) may include a core including an acrylic rubbery polymer, and a shell formed by grafting a monomer mixture including an aromatic vinyl compound and a vinyl cyanide compound on the core.

The acrylic rubbery polymer may be a cross-linked polymer of monomers including ethyl acrylate, butyl acrylate, 2-ethylhexyl acrylate, hexyl acrylate, or a combination thereof.

About 20 wt % to about 60 wt % of the acrylic rubbery polymer based on 100 wt % of the acrylic graft copolymer (A) may be included.

The shell may be a copolymer of the monomer mixture including the aromatic vinyl compound and the vinyl cyanide compound in a weight ratio of about 5:5 to about 8:2.

The acrylic rubbery polymer may have an average particle diameter of about 100 nm to about 800 nm.

The acrylic graft copolymer (A) may be an acrylonitrile-styrene-acrylate graft copolymer.

The aromatic vinyl-vinyl cyanide copolymer (B) may be a copolymer of a monomer mixture including about 60 wt % to about 80 wt % of an aromatic vinyl compound and about 20 wt % to about 40 wt % of a vinyl cyanide compound based on 100 wt % of the aromatic vinyl-vinyl cyanide copolymer.

The aromatic vinyl-vinyl cyanide copolymer (B) may have a weight average molecular weight of about 80,000 g/mol to about 200,000 g/mol.

The aromatic vinyl-vinyl cyanide copolymer (B) may be a styrene-acrylonitrile copolymer.

The alkyl (meth)acrylate-based resin (C) may have a glass transition temperature of about 100° C. to about 150° C.

The alkyl (meth)acrylate-based resin (C) may be a polymethylmethacrylate resin.

The thermoplastic resin composition may further include one or more additives comprising a flame retardant, a nucleating agent, a coupling agent, filler, a plasticizer, an impact-reinforcing agent, a lubricant, an antibacterial agent, a release agent, a heat stabilizer, an antioxidant, an ultraviolet (UV) absorber, an antistatic agent, a pigment, and/or a dye.

The present disclosure also relates to a molded product using the thermoplastic resin composition.

The thermoplastic resin composition may have excellent scratch resistance, weather resistance, and impact resistance, and may have less volatile gas generation when manufacturing a molded product.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

In the present invention, unless otherwise described, the average particle diameter refers to a Z-average particle diameter measured using a dynamic light scattering (DLS) analyzer. DLS analyzers are commercially available and methods for measuring Z-average particle diameter using the same are well known and understood in the art.

The present disclosure relates to a thermoplastic resin composition that can have improved scratch resistance, weather resistance, and impact resistance, and less volatile gas generation during a manufacture of a molded product.

The thermoplastic resin composition includes: 100 parts by weight of a base resin including (A) about 35 wt % to about 55 wt % of an acrylic graft copolymer; (B) about 35 wt % to about 55 wt % of an aromatic vinyl-vinyl cyanide copolymer; and (C) about 2 wt % to about 15 wt % of an alkyl(meth)acrylate-based resin, (D) about 0.4 parts by weight to about 2 parts by weight of a first sterically hindered amine represented by Chemical Formula 1; and (E) about 0.4 parts by weight to about 2 parts by weight of a second sterically hindered amine represented by Chemical Formula 2.

Chemical Formula 1 and Chemical Formula 2 may be as follows:

[Chemical Formula 1]

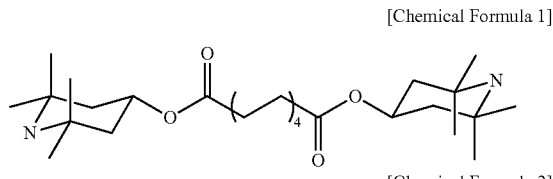

[Chemical Formula 2]

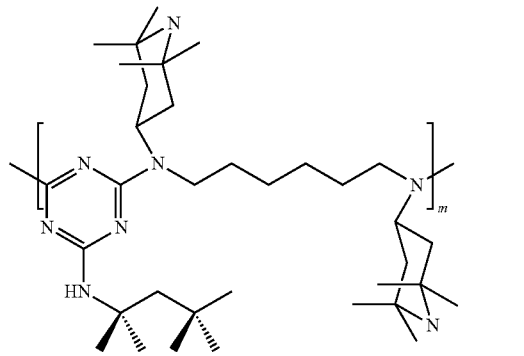

In Chemical Formula 2, m is an integer of 2 to 20.

Hereinafter, each component of the thermoplastic resin composition is described in detail.

(A) Acrylic Graft Copolymer

The acrylic graft copolymer may be prepared by performing a graft polymerization of a monomer mixture including an aromatic vinyl compound and a vinyl cyanide compound on a core including an acrylic rubbery polymer.

The acrylic graft copolymer may be prepared according to any manufacturing method known to those skilled in the art.

A conventional polymerization method known in the art, for example, emulsion polymerization, suspension polymerization, solution polymerization, bulk polymerization, or the like may be used to prepare the acrylic graft copolymer. As a non-limiting example, the acrylic graft copolymer may be manufactured by a method including preparing an acrylic rubbery polymer and graft-polymerizing a monomer mixture including an aromatic vinyl compound and a vinyl cyanide compound on a core formed of one or more layers of the acrylic rubbery polymer, to form one or more shells.

The acrylic rubbery polymer may be a cross-linked polymer prepared by using an acrylic monomer as a main monomer. Examples of the acrylic monomer may include without limitation ethyl acrylate, butyl acrylate, 2-ethylhexyl acrylate, and/or hexyl acrylate, and the like, and/or mixtures and/or combinations thereof.

The acrylic monomer may be copolymerized with one or more other radically polymerizable monomers. When copolymerized, an amount of the one or more other radically polymerizable monomer may be about 5 wt % to about 30 wt %, for example about 10 wt % to about 20 wt %, based on a total weight (100 wt %) of the acrylic rubbery polymer. In some embodiments, the acrylic rubber polymer may include the other radically polymerizable monomer in an amount of about 5, 6, 7, 8, 9, 10, 11, 12, 13, 14, 15, 16, 17, 18, 19, 20, 21, 22, 23, 24, 25, 26, 27, 28, 29, or 30 wt %, based on 100 wt % of the acrylic rubbery polymer. Further, according to some embodiments, the amount of the other radically polymerizable monomer can be in a range from about any of the foregoing amounts to about any other of the foregoing amounts.

Examples of the aromatic vinyl compound included in the shell may include without limitation styrene, α-methylstyrene, p-methylstyrene, p-t-butylstyrene, 2,4-dimethylstyrene, chlorostyrene, vinyltoluene, and/or vinylnaphthalene, and the like, and/or mixtures and/or combinations thereof.

Examples of the vinyl cyanide compound included in the shell may include without limitation acrylonitrile, methacrylonitrile, and/or fumaronitrile, and the like, and/or mixtures and/or combinations thereof.

The acrylic graft copolymer may include the acrylic rubbery polymer in an amount of about 20 wt % to about 60 wt %, for example about 30 wt % to about 60 wt %, for example about 40 wt % to about 60 wt % based on the total weight (100 wt %) of the acrylic graft copolymer. In some embodiments, the acrylic graft copolymer may include the acrylic rubbery polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %, based on 100 wt % of the acrylic graft copolymer. Further, according to some embodiments, the amount of the acrylic rubbery polymer can be in a range from about any of the foregoing amounts to about any other of the foregoing amounts.

In the shell formed by graft-polymerizing the monomer mixture including the aromatic vinyl compound and the vinyl cyanide compound on the rubbery polymer, the shell may be a copolymer of the monomer mixture of the aromatic vinyl compound and the vinyl cyanide compound in a weight ratio of about 5:5 to about 8:2, for example, about 5:5 to about 7:3.

The acrylic graft copolymer (A) may be an acrylonitrile-styrene-acrylate graft copolymer.

The acrylic rubbery polymer of the acrylic graft copolymer (A) may have an average particle diameter of, for example, about 100 nm to about 800 nm, about 100 nm to about 700 nm, about 100 nm to about 600 nm, about 100 nm to about 500 nm, about 200 nm to about 500 nm, or about 200 nm to about 400 nm.

When the average particle diameter of the acrylic rubber polymer is within the above ranges, mechanical properties such as impact resistance and tensile strength and workability of the thermoplastic resin composition including the same may be improved.

The base resin may include the acrylic graft copolymer in an amount of about 35 wt % to about 55 wt %, for example about 40 wt % to about 55 wt %, for example about 45 wt % to about 55 wt %, based on 100 wt % of the base resin. In some embodiments, the base resin may include the acrylic graft copolymer in an amount of about 35, 36, 37, 38, 39, 40, 41, 42, 43, 44, 45, 46, 47, 48, 49, 50, 51, 52, 53, 54, or 55 wt %, based on 100 wt % of the base resin. Further, according to some embodiments, the amount of the acrylic graft copolymer can be in a range from about any of the foregoing amounts to about any other of the foregoing amounts.

When the amount of the acrylic graft copolymer is less than about 35 wt %, impact resistance of the thermoplastic resin composition may be lowered, and when the amount of the acrylic graft copolymer exceeds about 55 wt %, mechanical rigidity and colorability of the thermoplastic resin composition may be lowered.

(B) Aromatic Vinyl-Vinyl Cyanide Copolymer

The aromatic vinyl-vinyl cyanide copolymer can be a phase separate from the acrylic graft copolymer described above. The acrylic graft copolymer can function as a domain phase and the aromatic vinyl-vinyl cyanide copolymer can function as a matrix phase in which the acrylic graft copolymer domain phase is dispersed.

The aromatic vinyl-vinyl cyanide copolymer may be a copolymer of a monomer mixture including an aromatic vinyl compound and a vinyl cyanide compound. The aromatic vinyl-vinyl cyanide copolymer may have a weight average molecular weight of greater than or equal to about 80,000 g/mol, for example greater than or equal to about 85,000 g/mol, for example greater than or equal to about 90,000 g/mol, for example, less than or equal to about 200,000 g/mol, for example less than or equal to about 150,000 g/mol, for example about 80,000 g/mol to about 200,000 g/mol, for example about 80,000 g/mol to about 150,000 g/mol.

The weight average molecular weight is measured by dissolving a powder sample in tetrahydrofuran (THF) and using 1200 series gel permeation chromatography (GPC) of Agilent Technologies Inc. (LF-804 of Shodex as a column and polystyrene of Shodex as a standard sample).

Examples of the aromatic vinyl compound may include without limitation styrene, a-methylstyrene, p-methylstyrene, p-t-butylstyrene, 2,4-dimethylstyrene, chlorostyrene, vinyltoluene, and/or vinylnaphthalene, and the like, and/or mixtures and/or combinations thereof.

Examples of the vinyl cyanide compound include without limitation acrylonitrile, methacrylonitrile, and/or fumaronitrile, and the like, and/or mixtures and/or combinations thereof.

The aromatic vinyl-vinyl cyanide copolymer may be a styrene-acrylonitrile copolymer (SAN) having a weight average molecular weight of about 80,000 g/mol to about 200,000 g/mol.

The aromatic vinyl-vinyl cyanide copolymer may be obtained by copolymerizing a monomer mixture including about 60 wt % to about 80 wt % of an aromatic vinyl compound and about 20 wt % to about 40 wt % of a vinyl cyanide compound based on 100 wt % of the aromatic vinyl-vinyl cyanide copolymer.

In some embodiments, the aromatic vinyl-vinyl cyanide copolymer may include the aromatic vinyl compound in an amount of about 60, 61, 62, 63, 64, 65, 66, 67, 68, 69, 70, 71, 72, 73, 74, 75, 76, 77, 78, 79, or 80 wt %, based on 100 wt % of the aromatic vinyl-vinyl cyanide copolymer. Further, according to some embodiments, the amount of the aromatic vinyl compound can be in a range from about any of the foregoing amounts to about any other of the foregoing amounts.

In some embodiments, the aromatic vinyl-vinyl cyanide copolymer may include the vinyl cyanide compound in an amount of about 20, 21, 22, 23, 24, 25, 26, 27, 28, 29, 30, 31, 32, 33, 34, 35, 36, 37, 38, 39, or 40 wt %, based on 100 wt % of the aromatic vinyl-vinyl cyanide copolymer. Further, according to some embodiments, the amount of the vinyl cyanide compound can be in a range from about any of the foregoing amounts to about any other of the foregoing amounts.

The base resin may include the aromatic vinyl-vinyl cyanide copolymer in an amount of about 35 wt % to about 55 wt %, for example, about 35 wt % to about 50 wt %, for example, about 40 wt % to about 50 wt % based on 100 wt % of the base resin. In some embodiments, the base resin may include the aromatic vinyl-vinyl cyanide copolymer in an amount of about 35, 36, 37, 38, 39, 40, 41, 42, 43, 44, 45, 46, 47, 48, 49, 50, 51, 52, 53, 54, or 55 wt %, based on 100 wt % of the base resin. Further, according to some embodiments, the amount of the aromatic vinyl-vinyl cyanide copolymer can be in a range from about any of the foregoing amounts to about any other of the foregoing amounts.

When the amount of the aromatic vinyl-vinyl cyanide copolymer is less than about 35 wt %, mechanical strength and heat resistance of the thermoplastic resin composition may be deteriorated, and when the amount of the aromatic vinyl-vinyl cyanide copolymer is greater than about 55 wt %, impact resistance and weather resistance of the thermoplastic resin composition may be deteriorated.

(C) Alkyl(meth) Acrylate-Based Resin

The alkyl(meth)acrylate-based resin is a separate phase from the acrylic graft copolymer, like the aforementioned aromatic vinyl-vinyl cyanide copolymer. The alkyl(meth) acrylate-based resin may be part of a matrix phase along with the aromatic vinyl-vinyl cyanide copolymer.

The alkyl(meth)acrylate-based resin may include a homopolymer of one type of alkyl(meth)acrylate-based monomer and/or a copolymer including at least two different types of alkyl(meth)acrylate-based monomers as a polymerization unit and optionally further including a (meth) acrylate-based monomer as a polymerization unit, as a polymer of the alkyl(meth)acrylate-based monomer. Accordingly, properties such as pyrolysis stability, coloring properties, impact resistance, and the like may be all together improved.

Examples of the alkyl(meth)acrylate-based monomer may include without limitation one or more unsubstituted C1 to C20 linear or branched alkyl(meth)acrylic acid esters, for example, methyl(meth)acrylate, ethyl(meth)acrylate, propyl (meth)acrylate, butyl(meth)acrylate, pentyl(meth)acrylate, hexyl(meth)acrylate, heptyl(meth)acrylate, ethylhexyl (meth)acrylate, octyl(meth)acrylate, and/or decyl(meth) acrylate and the like. These may be used alone or in combination of two or more.

For example, the alkyl(meth)acrylate-based monomer may be methyl methacrylate, and/or methyl acrylate. In this case, the alkyl(meth)acrylate-based resin in combination with the acrylic graft copolymer may further increase scratch resistance, coloring properties, and impact resistance of the thermoplastic resin composition.

The alkyl(meth)acrylate-based resin may include a copolymer of methyl methacrylate and methyl acrylate. That is, in an embodiment, the alkyl(meth)acrylate-based resin may include a polymethyl methacrylate (PMMA) resin. In this case, the polymethyl methacrylate resin may be a copolymer of a monomer mixture including about 80 wt % to about 99 wt % of the methyl methacrylate, and about 1 wt % to about 20 wt % of the methyl acrylate.

In some embodiments, the polymethyl methacrylate resin can include the methyl methacrylate monomer in an amount of about 80, 81, 82, 83, 84, 85, 86, 87, 88, 89, 90, 91, 92, 93, 94, 95, 96, 97, 98, or 99 wt %, based on 100 wt % of the polymethyl methacrylate resin. Further, according to some embodiments, the amount of the methyl methacrylate monomer can be in a range from about any of the foregoing amounts to about any other of the foregoing amounts.

In some embodiments, the polymethyl methacrylate resin can include the methyl acrylate monomer in an amount of about 1, 2, 3, 4, 5, 6, 7, 8, 9, 10, 11, 12, 13, 14, 15, 16, 17, 18, 19, or 20 wt %, based on 100 wt % of the polymethyl methacrylate resin. Further, according to some embodiments, the amount of the methyl acrylate monomer can be in a range from about any of the foregoing amounts to about any other of the foregoing amounts.

The alkyl(meth)acrylate-based resin may be obtained by polymerizing raw material monomers by a known polymerization method such as suspension polymerization, bulk polymerization, and emulsion polymerization.

The alkyl(meth)acrylate-based resin may have a glass transition temperature of about 100° C. to about 150° C., for example about 100° C. to about 130° C., for example about 105° C. to about 130° C., for example about 110° C. to about 130° C.

The weight average molecular weight of the alkyl(meth) acrylate-based resin may be about 50,000 g/mol to about 200,000 g/mol, for example about 70,000 g/mol to about 150,000 g/mol. The weight average molecular weight is a molecular weight reduced to polystyrene measured using gel permeation chromatography (GPC). Within the above range, the thermoplastic resin composition may exhibit improved scratch resistance and moldability.

The base resin may include the alkyl(meth)acrylate-based resin in an amount of about 2 wt % to about 15 wt %, for example about 2 wt % to about 14 wt %, for example about 2 wt % to about 13 wt %, for example about 2 wt % to about 12 wt %, based on 100 wt % of the base resin. In some embodiments, the base resin may include the alkyl(meth) acrylate-based resin in an amount of about 2, 3, 4, 5, 6, 7, 8, 9, 10, 11, 12, 13, 14, or 15 wt %, based on 100 wt % of the base resin. Further, according to some embodiments, the amount of the alkyl(meth)acrylate-based resin can be in a range from about any of the foregoing amounts to about any other of the foregoing amounts.

When the amount of the alkyl(meth)acrylate-based resin is less than about 2 wt %, coloring properties, scratch resistance, and weather resistance of the thermoplastic resin composition may be lowered, and when the amount of the alkyl(meth)acrylate-based resin exceeds about 15 wt %, mechanical properties such as impact resistance may be lowered.

(D, E) Sterically Hindered Amine

The thermoplastic resin composition includes a sterically hindered amine for reinforcing weather resistance. The sterically hindered amine is a primary amine wherein an amino group ($—NH_2$) is fixed to a tertiary carbon atom or a secondary amine wherein an amino group is fixed to a secondary or tertiary carbon atom.

The sterically hindered amine may complement optical stability, for example, UV stability of the thermoplastic resin composition and thus improve weather resistance of the thermoplastic resin composition. In other words, in an embodiment, the sterically hindered amine may work as a light stabilizer.

The thermoplastic resin composition may include two types of sterically hindered amines. Herein, this thermoplastic resin composition including two types of sterically hindered amines may generate much less volatile gas as well as maintain excellent weather resistance during the manufacture of a molded product, compared with a thermoplastic resin composition including one type of sterically hindered amine.

The sterically hindered amine may include a first sterically hindered amine and a second sterically hindered amine.

The first sterically hindered amine may be represented by Formula 1:

[Chemical Formula 1]

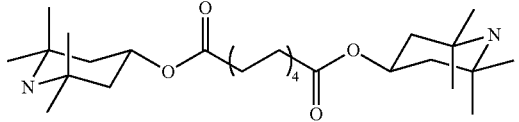

The thermoplastic resin composition may include the first sterically hindered amine in an amount of about 0.4 parts by weight to about 2 parts by weight, for example, about 0.4 parts by weight to about 1.8 parts by weight, for example, about 0.4 parts by weight to about 1.5 parts by weight based on about 100 parts by weight of the base resin. In some embodiments, the thermoplastic resin composition may include the first sterically hindered amine in an amount of about 0.4, 0.5, 0.6, 0.7, 0.8, 0.9, 1, 1.1, 1.2, 1.3, 1.4, 1.5, 1.6, 1.7, 1.8, 1.9, or 2 parts by weight, based on about 100 parts by weight of the base resin. Further, according to some embodiments, the amount of the first sterically hindered amine can be in a range from about any of the foregoing amounts to about any other of the foregoing amounts.

When the amount of the first sterically hindered amine is less than about 0.4 parts by weight, weather resistance of the thermoplastic resin composition and a molded product using the same may be greatly deteriorated, and when the amount of the first sterically hindered amine is greater than about 2 parts by weight, the generation amount of volatile gas during the manufacture of the molded product may be increased.

The second sterically hindered amine may be represented by Chemical Formula 2:

[Chemical Formula 2]

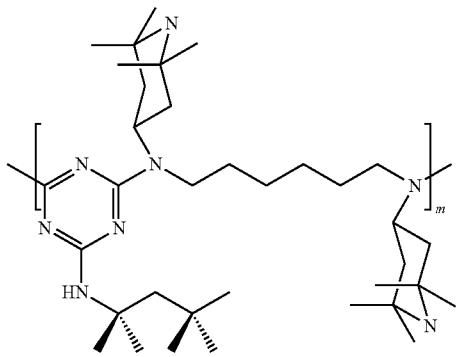

In Chemical Formula 2, m is an integer of 2 to 20.

The thermoplastic resin composition may include the second sterically hindered amine in an amount of about 0.4 parts by weight to about 2 parts by weight, for example, about 0.4 parts by weight to about 1.8 parts by weight, for example, about 0.4 parts by weight to about 1.5 parts by weight based on about 100 parts by weight of the base resin. In some embodiments, the thermoplastic resin composition may include the second sterically hindered amine in an amount of about 0.4, 0.5, 0.6, 0.7, 0.8, 0.9, 1, 1.1, 1.2, 1.3, 1.4, 1.5, 1.6, 1.7, 1.8, 1.9, or 2 parts by weight, based on about 100 parts by weight of the base resin. Further, according to some embodiments, the amount of the second sterically hindered amine can be in a range from about any of the foregoing amounts to about any other of the foregoing amounts.

When the amount of the second sterically hindered amine is less than about 0.4 parts by weight, weather resistance of the thermoplastic resin composition and a molded product using the same may be greatly deteriorated, and when the amount of the second sterically hindered amine is greater than about 2 parts by weight, impact resistance may be deteriorated during the manufacture of the molded product.

(F) Other Additives

The thermoplastic resin composition may further include one or more additives depending on the final use of the thermoplastic resin composition and/or the properties of the thermoplastic resin composition during processing and use, in addition to the components (A) to (E).

Examples of the additive may include without limitation flame retardants, nucleating agents, coupling agents, fillers, plasticizers, impact-reinforcing agents, lubricants, antibacterial agents, release agents, heat stabilizers, antioxidants, ultraviolet (UV) absorbers, antistatic agents, pigments, and/or dyes, and the like, which may be used alone or in a combination of two or more.

For example, a heat stabilizer and an ultraviolet (UV) absorber as the additives may be further included to strengthen weather resistance and reinforce thermal stability, and a lubricant and the like may be further included to improve balance of other properties.

For example, an organic/inorganic filler such as glass fiber, carbon fiber, talc, mica, calcium carbonate, clay, graphite, carbon black, calcium silicate, montmorillonite, bentonite, Teflon powders, and/or wood powders, and the like may be further added as the additive.

These additives may be appropriately included in amounts selected to minimize deterioration of properties of the thermoplastic resin composition, for example, may be included in an amount of less than or equal to about 20 parts by weight based on about 100 parts by weight of the basic resin but is not limited thereto.

In some embodiments, the thermoplastic resin composition may be mixed with one or more other resins and/or other rubber components.

Another embodiment provides a molded product including the thermoplastic resin composition of the present disclosure. The molded product may be manufactured using various methods known in the related art, for example, but not limited to, injection molding, extrusion molding, and the like using the thermoplastic resin composition. The molded product can have excellent scratch resistance, weather resistance, and impact resistance, and have less volatile gas generation during a manufacture of the molded product.

The molded product may be advantageously used for various electronic parts, construction materials, leisure goods, auto parts, and the like. For example, the molded product may be used for paintable and/or non-paintable automotive interior and/or exterior materials, for example, automotive exterior materials such as a car door filler, a radiator grille, and a side mirror housing, automotive interior materials such as a car seat, a glove box, a door pocket, a room mirror housing, and a dash board, and the like. However, the use of the molded product is not limited thereto.

Hereinafter, the present invention is illustrated in more detail with reference to examples. These examples, however, are not in any sense to be interpreted as limiting the scope of the invention.

EXAMPLES 1 TO 4 AND COMPARATIVE EXAMPLES 1 TO 9

The components shown in Table 1, along with 2 parts by weight of carbon black masterbatch (a SAN resin and carbon black in a weight ratio of about 50:50) for easy evaluation of coloring properties, are mixed using a common mixer and then extruded at about 230° C. using a twin-screw extruder (L/D=29, Φ=45 mm) to prepare pellet-shaped thermoplastic resin compositions.

The obtained pellets are dried in an about 80° C. dehumidifying drier for about 4 hours before injection molding and then injection-molded using a 6 oz injection molding machine set at a cylinder temperature of about 230° C. and at a mold temperature of about 60° C. to prepare specimens for evaluation of properties. The measured properties are shown in Table 2.

TABLE 1

| | Examples | | | | Comparative Examples | | | | | | | | |
|---|---|---|---|---|---|---|---|---|---|---|---|---|---|
| Components | 1 | 2 | 3 | 4 | 1 | 2 | 3 | 4 | 5 | 6 | 7 | 8 | 9 |
| (A) Acrylic graft copolymer | 46 | 46 | 46 | 51 | 46 | 46 | 46 | 46 | 46 | 46 | 46 | 46 | 46 |
| (B) Aromatic vinyl-vinyl cyanide copolymer | 51 | 46 | 44 | 40 | 54 | 46 | 46 | 46 | 46 | 46 | 54 | 54 | 51 |
| (C) Alkyl(meth)acrylate-based resin | 3 | 8 | 10 | 9 | 0 | 8 | 8 | 8 | 8 | 8 | 0 | 0 | 3 |
| (D) First sterically hindered amine | 1.0 | 1.0 | 1.0 | 1.0 | 1.0 | 0.3 | 1.0 | 2.6 | 0.3 | 2.6 | 0 | 1.0 | 0 |
| (E) Second sterically hindered amine | 1.0 | 1.0 | 1.0 | 1.0 | 1.0 | 1.0 | 0.3 | 2.6 | 2.6 | 0.3 | 1.0 | 0 | 0 |
| (E') Ultraviolet (UV) stabilizer | 0 | 0 | 0 | 0 | 0 | 0 | 0 | 0 | 0 | 0 | 0 | 0 | 1.0 |
| (F) Filler | 0 | 0 | 0 | 11 | 0 | 0 | 0 | 0 | 0 | 0 | 0 | 0 | 0 |

In Table 1, the components (A) to (C) are shown by wt %, and the components (D) to (F) are shown by a part by weight based on 100 parts by weight of the components (A) to (C).

(A) Acrylic Graft Copolymer

An acrylonitrile-styrene-acrylate graft copolymer (g-ASA) including about 50 wt % of a core including a butyl acrylate rubbery polymer having an average particle diameter of about 380 nm and a shell grafted onto the core by using styrene and acrylonitrile in a weight ratio of about 7:3 is used. (Manufacturer: Lotte Advanced Materials)

(B) Aromatic Vinyl-Vinyl Cyanide Copolymer

When measured with gel permeation chromatography (GPC), a styrene-acrylonitrile copolymer (SAN) having a weight average molecular weight of about 110,000 g/mol and including about 24 wt % of the acrylonitrile is used. (Manufacturer: Lotte Advanced Materials)

(C) Alkyl(meth)acrylate-Based Resin

A polymethylmethacrylate (PMMA) resin having a glass transition temperature of about 120° C. and a weight average molecular weight of about 85,000 g/mol is used. (Manufacturer: Arkema Inc.)

(D) First Sterically Hindered Amine

A sterically hindered amine represented by Chemical Formula 1 is used. (Manufacturer: BASF Corp., Product Name: Tinuvin® 770)

(E) Second Sterically Hindered Amine

A sterically hindered amine represented by Chemical Formula 2 is used (Manufacturer: BASF Corp., Product Name: Chimassorb® 944)

(E') Ultraviolet (UV) Stabilizer

A sterically hindered amine represented by Chemical Formula 3 as a sterically hindered amine differing from the second sterically hindered amine is used. (Manufacturer: Solvay, Product Name: Cyasorb® UV-3853)

[Chemical Formula 3]

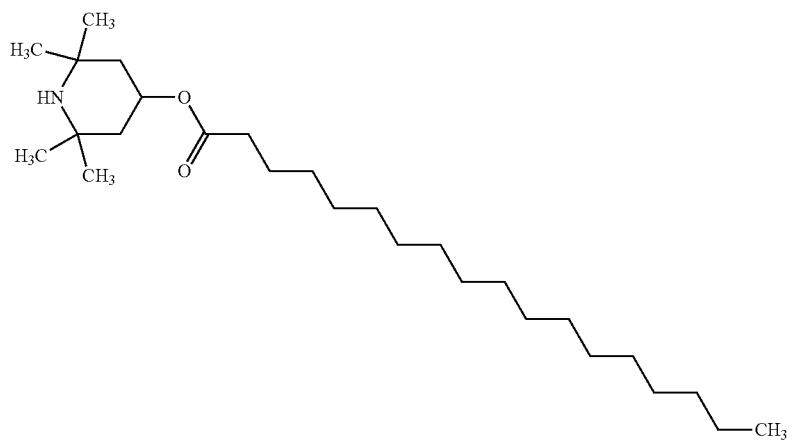

(F) Filler

Talc having an average particle diameter (D50) of about 3.9 μm (Manufacturer: Imerys, Product Name: Jetfine® 3CA) measured by using a laser particle size analyzer (Manufacturer: Malvern Panalytical, Model Name: Mastersizer 3000) is used.

Evaluation

A fogging test, a scratch resistance test, a weather resistance test, and an impact resistance test of the pellets or the specimens according to Examples 1 to 4 and Comparative Examples 1 to 9 are respectively performed in the following evaluation methods, and the results are shown in Table 2.

1. Fogging (Unit: ppm)

For each example and comparative example, about 4 g of pellets are put in a glass petri dish (a thickness of about 2 mm) having a diameter of about 50 mm and a height of about 10 mm and covered with glass petri dish (a thickness of 2 mm) having a diameter of about 60 mm and a height of about 10 mm and then heated on an about 250° C. hot plate for about 2 hours and aged by cooling the hot plate down to room temperature. Subsequently, a weight difference of the glass petri dish used for the covering before and after the heating is divided by the pellet weight to calculate a generation amount of volatile gas deposited in the glass petri dish.

2. Scratch Resistance

The specimens are scratched by positioning a tip of a scratch stylus with an angle of about 90° against the specimens and then applying a load of about 10 N thereto in a fixed load test method according to DIN EN ISO 1518. Subsequently, referring to a CIE Lab D65 spin sphere and an SCE mode, brightness differences (dL) of the specimens between initial brightness and brightness after the scratch are calculated.

Herein, as for the brightness, black is 0, white is 100, and as dL is smaller, scratch resistance is more excellent.

3. Weather Resistance (Unit: %)

For a specimen having an initial surface gloss, measured at 60° with a gloss meter (Manufacturer: Nippon Denshoku Industries Co., Ltd., Model Name: VG 7000), in a range of about 90 to 100 GU (Gloss Unit), a long-term weatherability evaluation is performed for about 3,000 hours according to SAE J 1960 (filter type: quartz/boro).

Subsequently, after completing the long-term weather resistance evaluation, a surface gloss of the specimen is measured at 60° using the gloss meter. This result is then divided by the initial surface gloss to calculate a gloss retention rate.

Herein, as the gloss retention rate is closer to 100%, the weather resistance is more excellent.

4. Impact Resistance (Unit: J/m)

Izod Impact strength of a notched ¼"-thick specimen is measured according to ASTM D256.

TABLE 2

| | Examples | | | | Comparative Examples | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| Volatile gas generation amount (ppm) | 3108 | 2876 | 3265 | 2998 | 3257 | 2915 | 3111 | 4598 | 3847 | 4345 | 2981 | 3630 | 3231 |
| Difference in lightness before/after scratch | 2.8 | 2.1 | 1.3 | 2.2 | 11.8 | 2.6 | 2.4 | 2.7 | 2.4 | 2.3 | 12.1 | 13.3 | 3.1 |
| Gloss retention rate (%) | 68 | 73 | 76 | 74 | 36 | 41 | 40 | 81 | 56 | 54 | 21 | 28 | 31 |
| Notch Izod Impact strength (J/m) | 118 | 111 | 98 | 87 | 132 | 114 | 106 | 65 | 63 | 103 | 110 | 104 | 108 |

Referring to the results of Tables 1 to 2, the thermoplastic resins composition including the acrylic graft copolymer, the aromatic vinyl-vinyl cyanide copolymer, the alkyl(meth)acrylate-based resin, the first sterically hindered amine represented by Chemical Formula 1, and the second sterically hindered amine represented by Chemical Formula 2 within the above ranges and molded products respectively using the same exhibit excellent scratch resistance, weather resistance, and impact resistance and a smaller generation amount of volatile gas during the manufacture of the molded product.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

For example, all numerical values and percentages provided throughout this disclosure can be approximate, and for each range specified in this disclosure, all values within the range and all subranges within the range are also disclosed. Approximate values and percentages can be calculated, and it is believed that each weight percentage can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

The use of the term "and/or" includes any and all combinations of one or more of the associated listed items.

What is claimed is:

1. A thermoplastic resin composition, comprising:
100 parts by weight of a base resin comprising:
(A) about 35 wt % to about 55 wt % of an acrylonitrile-styrene-acrylate graft copolymer;
(B) about 35 wt % to about 55 wt % of an aromatic vinyl-vinyl cyanide copolymer; and
(C) about 2 wt % to about 15 wt % of an alkyl(meth)acrylate-based resin;
(D) about 1 parts by weight to about 2 parts by weight of a first sterically hindered amine represented by Chemical Formula 1; and
(E) about 1 parts by weight to about 2 parts by weight of a second sterically hindered amine represented by Chemical Formula 2:

[Chemical Formula 1]

[Chemical Formula 2]

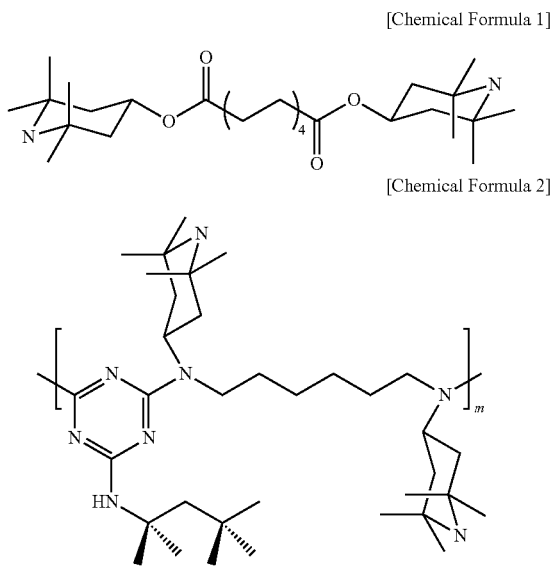

wherein, in Chemical Formula 2, m is an integer of 2 to 20.

2. The thermoplastic resin composition of claim 1, wherein the acrylonitrile-styrene-acrylate graft copolymer (A) comprises a core comprising an acrylate polymer, and a shell formed by grafting a monomer mixture comprising an styrene and a acrylonitrile on the core.

3. The thermoplastic resin composition of claim 2, wherein the acrylate rubbery polymer is a cross-linked polymer of monomers comprising ethyl acrylate, butyl acrylate, 2-ethylhexyl acrylate, hexyl acrylate, or a combination thereof.

4. The thermoplastic resin composition of claim 2, wherein the acrylate polymer is included in an amount of about 20 wt % to about 60 wt % of the acrylonitrile-styrene-acrylate graft copolymer (A).

5. The thermoplastic resin composition of claim 2, wherein in the monomer mixture the styrene and the acrylonitrile are present in a weight ratio of about 5:5 to about 8:2.

6. The thermoplastic resin composition of claim 2, wherein the core has an average particle diameter of about 100 nm to about 800 nm.

7. The thermoplastic resin composition of claim 1, wherein the (B) aromatic vinyl-vinyl cyanide copolymer comprises a copolymer of a monomer mixture comprising about 60 wt % to about 80 wt % of an aromatic vinyl compound and about 20 wt % to about 40 wt % of a vinyl cyanide compound based on 100 wt % of the aromatic vinyl-vinyl cyanide copolymer.

8. The thermoplastic resin composition of claim 1, wherein the aromatic vinyl-vinyl cyanide copolymer (B) has a weight average molecular weight of about 80,000 g/mol to about 200,000 g/mol.

9. The thermoplastic resin composition of claim 1, wherein the (B) aromatic vinyl-vinyl cyanide copolymer is a styrene-acrylonitrile copolymer.

10. The thermoplastic resin composition of claim 1, wherein the alkyl (meth)acrylate-based resin (C) has a glass transition temperature of about 100° C. to about 150° C.

11. The thermoplastic resin composition of claim 10, wherein the alkyl (meth)acrylate-based resin (C) is a polymethylmethacrylate resin.

12. The thermoplastic resin composition of claim 1, further comprising an additive comprising a flame retardant, a nucleating agent, a coupling agent, filler, a plasticizer, an impact-reinforcing agent, a lubricant, an antibacterial agent, a release agent, a heat stabilizer, an antioxidant, an ultraviolet (UV) absorber, an antistatic agent, a pigment, and/or a dye.

13. A molded product using the thermoplastic resin composition of claim 1.

* * * * *